United States Patent [19]

Drawert et al.

[11] 4,396,759
[45] Aug. 2, 1983

[54] METHOD OF ADHERING TEXTILES

[75] Inventors: Manfred Drawert, Froendenberg; Wolfgang Imoehl, Unna, both of Fed. Rep. of Germany

[73] Assignee: Schering Aktiengesellschaft, Berlin and Bergkamen, Fed. Rep. of Germany

[21] Appl. No.: 381,209

[22] Filed: May 24, 1982

Related U.S. Application Data

[63] Continuation-in-part of Ser. No. 274761, Jun. 18, 1981, abandoned.

[30] Foreign Application Priority Data

Jul. 31, 1980 [DE] Fed. Rep. of Germany ....... 3029040

[51] Int. Cl.$^3$ .............................................. C09J 3/16
[52] U.S. Cl. ................................ 528/339.3; 156/332; 260/404.5; 528/323; 528/324; 528/325
[58] Field of Search ................ 156/332; 528/323, 324, 528/325, 339.3; 260/404.5 PA

[56] References Cited

U.S. PATENT DOCUMENTS 3,397,816  8/1968  Ess et al. ........................... 528/339.3

FOREIGN PATENT DOCUMENTS 752931  2/1967  Canada ............................. 528/339.3
45383  2/1982  European Pat. Off. ......... 528/339.3

Primary Examiner—Ronald W. Griffin
Attorney, Agent, or Firm—Curtis, Morris & Safford

[57] ABSTRACT

What are disclosed are a polyamide polymer and its use as a melt adhesive for adhering textiles, said polymer having a melt viscosity, measured at 220° C., of 5–150 Pas and being the reaction product of approximately equivalent amounts of an acid component and a basic component, said acid component comprising (a) (1) a dimerized fatty acid having a content of 70–100 percent by weight of dimeric fatty acid and, optionally, (a) (2) a monocarboxylic acid, as a molecular weight regulator, having up to 22 carbon atoms, which monocarboxylic acid may be present in an amount up to 50 equivalent percent of the total carboxy groups of the mixture (a) (1) and (a) (2);

(b) at least one aliphatic straight chain co-dicarboxylic acid having 6 to 13 carbon atoms, wherein the ratio of carboxylic acid according to (a) (1) and (a) (2) to carboxylic acid according to (b) is from 0.05:1 to 5:1, calculated on the carboxy groups, said basic component comprising (c) an aliphatic straight-chain diprimary diamine having 6 to 12 carbon atoms and (d) from 0.5 to 1.5 mol, per mol of carboxyl groups of said acid component, of a mixture comprising from 95 to 30 mol percent of caprolactam, ε-aminocaproic acid, or a mixture thereof and 5 to 70 mol percent of 11-aminoundecanoic acid, 12-aminododecanoic acid, lauryl lactam, or a mixture thereof.

14 Claims, No Drawings

METHOD OF ADHERING TEXTILES

This application is a continuation-in-part of application Ser. No. 274,761, filed June 18, 1981 and now abandoned.

The present invention relates to methods for adhering textiles with a polyamide melt adhesive, and to such adhesives.

U.S. Pat. No. 4,045,389 granted Aug. 30, 1977 teaches methods for adhering textiles with polyamide melt adhesives having a melt viscosity, measured at 220° C., of 25–600 Pas. These prior art polyamide melt adhesives comprise substantially equivalent amounts of an acid component and a basic component, said acid component comprising (a)(1) a dimerized fatty acid having a content of 70–100 percent by weight of dimeric fatty acid and, optionally, (2) a monocarboxylic acid, as a molecular weight regulator, whereby up to 50 equivalent percent of the total carboxy groups of the mixture (a) (1) and (2) can be derived from the monocarboxylic acid, and (b) one or more aliphatic straight chain co-dicarboxylic acids having 6–13 carbon atoms, wherein the ratio of carboxylic acids according to (a) (1) and (2) to carboxylic acid according to (b) is from 0.05:1 to 5:1, calculated on the carboxy groups, and said basic component comprising (c) an aliphatic straight chain diprimary diamine having 6–12 carbon atoms and (d) caprolactam, $\epsilon$-aminocaproic acid, or mixtures thereof such that from 0.5 to 1.5 mols of caprolactam, $\epsilon$-aminocaproic acid, or mixtures thereof are reacted per mol of carboxyl groups in said acid component.

According to the present invention, it has now been found that if these prior art polyamide melt adhesives are modified by the replacement of from 5 to 70 mol percent, preferably from 10 to 50 mol percent, of the caprolactam or $\epsilon$-aminocaproic acid with a member selected from the group consisting of 11-aminoundecanoic acid, 12-aminododecanoic acid and lauric acid lactam (lauryl lactam), melt adhesives with a viscosity at 220° C. of 5–150 Pas, preferably 25–150 Pas, are obtained. When textiles are adhered with these new adhesives, adhesive bonds having improved wet tear strength and improved resistance to halogenated hydrocarbons and to hot aqueous alkalies are obtained. Preferred polyamide melt adhesives according to the invention are those in which the ratio of carboxylic acids (a) to carboxylic acids (b) is from 0.1:1 to 1.0:1, those in which the co-dicarboxylic acid (b) is sebacic acid or azelaic acid, those in which the diamine (c) is hexamethylene diamine, and those in which the dimerized fatty acid (a) is one containing more than 90 percent by weight of dimeric fatty acid.

A number of German patent publications (e.g. DE-OS No. 1,594,233; DE-OS No. 1,939,758; DE-OS No. 2,204,492; DE-OS No. 2,209,035; and DE-OS 2,324,160) teach copolyamides useful for the adhesion of textiles which contain 11-aminoundecanoic acid or lauryl lactam as an essential component. The copolyamides prepared from these materials still show certain defects, such as an often bad resistance to wet tearing after dry cleaning or washing, as well as insufficient adhesion values when the melt adhesive has a low softening point.

German Patent Publication DE-OS No. 2,261,525 describes copolymers which, in addition to a polymethylene-$\delta$-amino acid and a polymethylene diamine, contain three other polymethylene di-acids. These copolymers are especially designed to have a large solubility, corresponding to the purpose for which they are used.

German Patent Publication DE-OS No. 2,147,205 teaches an adhesive for adhering textiles, which adhesive comprises a dimeric fatty acid, an aliphatic co-dicarboxylic acid, and an amine ester comprising hexamethylene diamine and xylylene diamine or isophorone diamine. These adhesives also show an unsatisfactory resistance to tearing.

Using these known polyamides comprising dimeric fatty acids, or using polyamides comprising caprolactam, adhesive bonds are obtained with an unsatisfactory resistance to halogenated hydrocarbons or alkaline washing baths. However, when textiles are adhered, the wet tear resistance must have high values since the adhesive bond is exposed to strong mechanical stresses during the process of cleaning. Further, for technical manufacturing reasons, in general a low softening point for the textile adhesive is additionally desired.

The melt adhesives to be used according to the invention, which comprise dimeric fatty acid, caprolactam or $\epsilon$-aminocaproic acid, diamine, and 11-aminoundecanoic acid, 12-aminododecanoic acid, and/or lauryl lactam, have a good resistance to halogenated hydrocarbons and especially also to alkaline washing baths at 60° C. (particularly those products with melting points below about 120° C.) and in part also (particularly for products having melting points above about 120° C.) to high temperature alkaline washing baths (95° C.) which have heretofore created problems.

The products according to the present invention are characterized by:

(1) a very good initial resistance to tear, i.e. high values prior to stressing by washing or cleaning processes; and (2) by very high wet tear strengths, i.e. values after cleaning when the material is still in a damp condition; and (3) by outstanding values of tear resistance after drying, which values are almost always re-attained even after many washing or cleaning cycles.

By the use of distilled dimeric fatty acids, melt adhesives having improved color numbers are obtained. On the other hand, the use of commercially-available technical polymerized fatty acids is possible for the preparation of melt adhesives for special uses. When technical dimerized fatty acids are used, note should be taken that the content of trimeric fatty acid should not exceed a maximum limit. This limiting value depends on the content of dimeric and nonomeric fatty acids in the polymerized fatty acids of the batch and can be determined by an orienting test which is within the routine capabilities of the average person skilled in the art.

The term "dimerized fatty acid" refers generally to polymerized acids which are obtained from "fatty acids". The term "fatty acid" encompasses unsaturated natural and synthetic monobasic aliphatic acids having from 12 to 22 carbon atoms, preferably 18 carbon atoms. These fatty acids can be polymerized by known methods (cf. DE-OS No. 1,443,938; DE-OS No. 1,443,968; DE-PS No. 2,118,702 and DE-PS No. 1,280,852).

Polymeric fatty acids typically available in commerce have the following approximate composition:

| monomeric acids | 5–15 percent by weight |
| --- | --- |
| dimeric acids | 60–80 percent by weight |
| trimeric acids | 10–35 percent by weight. |

The content of dimeric acids can be raised up to 100 percent by weight by generally known distillation methods.

For the polyamides to be used according to the present invention, dimerized fatty acids having a content of more than 90 percent by weight of dimeric fatty acids, and small amounts of trimeric fatty acids (2–6 percent by weight) and of monomeric fatty acids (0–1.5 percent by weight), such as are generally obtainable in commerce, are preferably used. It is also possible to introduce the dimerized fatty acids in their hydrogenated form.

The polyamides to be employed according to the present invention lie in a specific melt viscosity region which reflects a certain molecular weight region.

Adjustment of the melt viscosity can take place by interruption of the reaction at a desired degree of polymerization or by working with non-equivalent amounts of carboxylic acids or amines. Because of certain disadvantages of these methods, the use of mono-functional or mono-functionally acting compounds (amines or carboxylic acids) as chain breakers, is preferred. Monocarboxylic acids have proved particularly advantageous from this viewpoint.

The possible content of monocarboxylic acid in the polymerized fatty acids used according to the invention can be raised by the addition of monocarboxylic acids thereto up to an amount of 50 equivalent percent, calculated on the total carboxy groups of the mixture of polymeric fatty acid with a monocarboxylic acid. If the amount of the required chain breaker (viscosity regulator), in this case the monocarboxylic acid, is high, then higher molecular weight monocarboxylic acids are preferred, such as palmitic, oleic, stearic, linoleic, linolenic acids, or mixtures thereof such as tall oil fatty acid or soya oil fatty acid, or other hydrophobic monocarboxylic acids. In general, the monocarboxylic acids contain up to 22 carbon atoms.

As short-chain monocarboxylic acids, aliphatic, cycloaliphatic, araliphatic, and aromatic acids can be used, such as acetic acid, propionic acid, butyric acid, valerianic acid, caproic acid, caprylic acid, capric acid, isononane acid, lauric acid, cyclohexene-3-carboxylic acid, diphenolic acid, and benzoic acid.

As exemplary of the aliphatic linear co-dicarboxylic acids having 6 to 13 carbon atoms which are to be used according to the present invention, adipic acid, monamethylene dicarboxylic acid, brassylic acid, and particularly, decamethylene dicarboxylic acid, azelaic acid, and sebacic acid are mentioned.

Instead of the carboxylic acids, their esters with low molecular weight alcohols can be employed. In this case, it is recommended, particularly if the amount of ester is high, that the caprolactam polymerization is started by the addition of water.

As exemplary of aliphatic straight-chain diprimary diamines having 6 to 12 carbon atoms to be used according to the present invention, 1,9-diaminononane, 1,12-diaminododecane, and particularly 1,6-diaminohexane can be mentioned.

The amount of amino acid or of lactam to be used, which is based on the mols of carboxyl groups of the acid present, depends on the value of the desired melting point. If the melt adhesives are used as textile adhesives, these materials are used in an amount of from 0.5–1.5 mols per mol of carboxyl groups of the polymerized fatty acid and of the co-dicarboxylic acids, particularly in an amount from 0.8–1.2 mols per mole of acids.

The amount of 11-aminoundecanoic acid, of 12-aminododecanoic acid, and lauryl lactam, used alone or in combination with each other, can be varied within relatively broad limits depending on the kind and amount of components (a)-(d), and depends in the first instance on the properties desired in the final product. According to the invention, 5–70 mol percent, particularly 10–50 mol percent, of the caprolactam or $\epsilon$-aminocaproic acid according to (d) is replaced by 11-aminoundecanoic acid, 12-aminododecanoic acid, lauryl lactam, or mixtures of two or more thereof.

The melt adhesive used according to the present invention for the adhesion of textiles are characterized not only by a good resistance to the cleaning agents used in dry cleaning, but particularly also by a good resistance to alkaline washing baths. This is true not only for the low-melting polyamides, which because of their low melting points are not suitable for high temperature washing, but also for the high-melting products, which retain their outstanding resistance even under the heretofore problem stresses of high temperature washing, e.g. at 95° C.

The materials which are to be adhered with the new melt adhesives are textiles, including also possibly siliconized textiles. The textiles are adhered to one another or to leather, rubber, and other materials.

The polyamides used according to the invention can be prepared by melt condensation of substantially equal amounts of the aforementioned reactants at temperatures between 200° C. and 290° C., particularly at 250° C., in an inert gas. In the last phase of the reaction, a vacuum is applied for attaining flawless products. The melt viscosity of the polyamides to be used according to the invention should in general be between 5 and 150 Pas, measured at 220° C.

A better understanding of the present invention and of its many advantages will be had by referring to the following specific Examples, given by way of illustration.

In the Examples, melting points are determined with a melting microscope using the techniques conventional in practice.

The adhesive bonds are prepared between strips of a polyester/wool (55 percent/45 percent) fabric 5 cm in breadth. The polyamide powder used has a grain diameter of 300–500 microns. The amount of adhesive applied is 20 g/m$^2$ of material. The coated fabric strips are adhered to a second, uncoated, fabric strip at temperatures which are about 20°–30° C. above the softening point of the polyamide adhesive. The adhesion time is about 15–20 seconds and the pressure employed is 400 g/cm$^2$.

In the washing and cleaning processes, the following steps are involved:

(1) The text material is washed with a 3 percent alkaline washing bath prepared from a typical commercially available machine washing agent at temperatures of 60° C. and 95° C. The washing process at 60° C. lasts 45 minutes: that at 95° C. lasts 90 minutes. The washing program include a rinse and spin cycle.

Dry cleaning takes place with perchloroethylene for 30 minutes at room temperature.

(2) The materials are then stored for 48 hours at normal ambient conditions.

(3) The washing or cleaning process is repeated.

(4) The material is dried for 24 hours at normal ambient conditions.

(5) The washing or cleaning process is repeated a total of 5 times. Before renewing the stressing process, the text material is completely dried by storage for 24 hours at normal ambient conditions.

(6) Directly after the fifth washing or dry cleaning cycle, the resistance of the adhesive bond to separation at room temperature is measured on the still-damp text sample following the procedure of DIN No. 53 357.

In the polyamides described in the following Examples, a polymerized distilled tall oil fatty acid was employed as the polymerized fatty acid and had the following composition:

| monomeric fatty acid | 2.7 percent |
|---|---|
| dimeric fatty acid | 94.1 percent |
| trimeric and higher polymeric fatty acids | 3.2 percent. |

EXAMPLE 1

25.35 g of distilled dimeric tall oil fatty acid, 13.65 g of stearic acid, 138.30 g of sebacic acid [ratio of carboxyl groups of (a) to (b)=0.1:1.0], 87.5 g of 1,6-diaminohexane, 153.04 g of caprolactam (0.9 mol/mol of carboxyl groups), and 32.35 g of 11-aminoundecanoic acid (0.1 mol/mol of carboxyl groups) are weighed into a reactor providing with a descending condenser, stirrer, and thermometer. The contents are then heated to a temperature of 250° C. under nitrogen over a period of two hours and are held at this temperature for 7 hours.

During the last four hours, a vacuum of 2 mm Hg is applied.

The polyamide obtained had the following values:
Melting point = 133° C.
Melt viscosity (220° C.) = 98.0 Pas

| Wet tear strength after five washes (at 60° C.) | = 5.5 kg/5 cm |
|---|---|
| (at 95° C.). | = 5.0 kg/5 cm |

The wet tear strength after five cleanings in perchloroethylene = 7.0 kg/5 cm.

The polyamides described in following Tables I and II were prepared and tested in analogous fashion and are reported as Examples 2-17. For purposes of comparison, commercially available polyamides comprising aminocarboxylic acids having comparable microscope melting points, but not comprising a dimeric fatty acid, were tested for wet tear strength. These values are reported in the Tables as Examples A, B, C, and D. The following abbreviations are used in the Tables:

(A) = Azelaic Acid
(D) = 1,10-Decamethylenedicarboxylic Acid
(S) = Sebacic Acid
(11-AU) = 11-Aminoundecanoic Acid
(12-AU) = 12-Aminododecanoic Acid
(L) = Lauryl lactam

TABLE I

Polyamide Melt Adhesives Having Melting Points ≥ 120° C.

| Example | Dimeric Fatty Acid (g) | Stearic Acid (g) | Co—dicarboxylic Acid (g) | Ratio of Fatty Acid COOH:Co—dicarboxylic Acid COOH | Caprolactam (g) | Amino Acid (g) | Mol Ratio Caprolactam: COOH | Mol Ratio, Amino Acid: COOH | 1,6-Diaminohexane (g) |
|---|---|---|---|---|---|---|---|---|---|
| 2 | 21.21 | 14.13 | 125.33 (S) | 0.10:1.00 | 77.06 | 146.63 (11-AU) | 0.50 | 0.50 | 79.29 |
| 3 | 67.37 | 13.00 | 114.04 (S) | 0.25:1.00 | 143.40 | 30.32 (11-AU) | 0.9 | 0.1 | 82.15 |
| 4 | 57.52 | 15.30 | 103.32 (S) | 0.25:1.00 | 72.18 | 137.33 (11-AU) | 0.5 | 0.50 | 74.28 |
| 5 | 113.10 | 11.20 | 100.1 (D) | 0.909:1.00 | 133.0 | 25.8 (12-AU) | 0.9 | 0.1 | 75.95 |
| 6 | 70.00 | 10.40 | 114.00 (S) | 0.25:1.00 | 143.5 | 13.9 (L) 14.2 (11-AU) | 0.9 | 0.05 (L) 0.05 (11-AU) | 82.00 |
| 7 | 24.60 | 10.00 | 115.00 (A) | 0.1:1.00 | 75.45 | 65.7 (L) 67.1 (11-AU) | 0.5 | 0.25 (L) 0.25(11-AU) | 77.60 |
| 8 | 60.4 | 20.00 | 114.0 (S) | 0.25:1.00 | 143.4 | 30.3 (11-AU) | 0.5 | 0.5 | 82.12 |
| 9 | 50.0 | 22.8 | 103.3 (S) | 0.25:1.00 | 72.2 | 137.3 (11-AU) | 0.5 | 0.5 | 74.25 |

| Example | Melting Point (°C.) | Viscosity at 220° C. (Pas) | Wet Tear Strength (kg/5 cm) Five Washing Cycles 60° C. | 95° C. | Five Dry Cleaning Cycles |
|---|---|---|---|---|---|
| 2 | 125 | 64.0 | 6.0 | 5.0 | 6.0 |
| 3 | 121 | 79.0 | 6.5 | 5.0 | 7.0 |
| 4 | 120 | 94.5 | 7.0 | 6.0 | 5.5 |
| 5 | 128 | 65.0 | 4.7 | 3.5 | 4.2 |
| 6 | 126 | 94.5 | 4.0 | — | 4.0 |
| 7 | 133 | 72.5 | 4.5 | — | 3.8 |
| 8 | 127 | 16.0 | — | — | 3.5 |
| 9 | 120 | 10.3 | — | — | 2.5 |
| A | 123 | — | — | 3.5 | — |
| B | 120 | — | — | 4.0 | — |

TABLE II

Polyamide Melt Adhesives Having Melting Points < 120° C.

| Dimeric Fatty | Stearic | Co—dicarboxylic | Ratio of Fatty Acid COOH:Co—dicar- | Capro- | | Mol Ratio Capro- | Mol Ratio, | 1,6-Diamino- |

TABLE II-continued

Polyamide Melt Adhesives Having Melting Points <120° C.

| Example | Acid (g) | Acid (g) | Acid (g) | boxylic Acid COOH | lactam (g) | Amino Acid (g) | lactam: COOH | Amino Acid: COOH | hexane (g) |
|---|---|---|---|---|---|---|---|---|---|
| 10 | 113.08 | 11.18 | 88.6 (S) | 0.50:1.00 | 133.02 | 28.12 (11-AU) | 0.9 | 0.1 | 76.06 |
| 11 | 26.52 | 12.48 | 129.61 (A) | 0.10:1.00 | 153.04 | 32.35 (11-AU) | 0.9 | 0.1 | 87.50 |
| 12 | 101.13 | 12.50 | 80.62 (S) | 0.50:1.00 | 67.58 | 128.58 (11-AU) | 0.5 | 0.5 | 69.55 |
| 13 | 19.28 | 15.78 | 116.54 (A) | 0.10:1.00 | 76.44 | 145.45 (11-AU) | 0.5 | 0.5 | 78.68 |
| 14 | 60.42 | 17.10 | 100.44 (A) | 0.25:1.00 | 74.86 | 133.16 (11-AU) | 0.5 | 0.5 | 77.01 |
| 15 | 101.66 | 15.19 | 77.70 (A) | 0.50:1.00 | 69.49 | 123.61 (11-AU) | 0.5 | 0.5 | 71.49 |
| 16 | 68.3 | 12.1 | 65.0 (D) 57.0 (S) | 0.25:1.00 | 151.4 | 13.9 (L) | 0.95 | 0.05 | 84.99 |
| 17 | 115.3 | 9.0 | 50.0 (D) 41.35 (A) | 0.50:1.00 | 133.0 | 25.8 (L) | 0.9 | 0.1 | 75.95 |
| 18 | 115.3 | 9.0 | 50.0 (D) 41.35 (A) | 0.50:1.00 | 133.0 | 28.16 (12-AU) | 0.9 | 0.1 | 75.95 |
| 19 | 115.3 | 9.0 | 50.0 (D) 44.1 (S) | 0.50:1.00 | 133.0 | 25.8 (12-AU) | 0.9 | 0.1 | 75.95 |
| 20 | 5 | 24.0 | 129.6 (S) | 0.10:1.00 | 153.0 | 32.35 (11-AU) | 0.9 | 0.1 | 87.5 |

| Example | Melting Point (°C.) | Viscosity at 220° C. (Pa.s) | Wet Tear Strength (kg/5 cm) Five Washing Cycles 60° C. | Wet Tear Strength (kg/5 cm) Five Washing Cycles 95° C. | Five Dry Cleaning Cycles |
|---|---|---|---|---|---|
| 10 | 117 | 86.0 | 6.5 | 3.5 | 5.5 |
| 11 | 113 | 97.0 | 7.0 | — | 7.0 |
| 12 | 112 | 77.0 | 7.0 | — | 5.0 |
| 13 | 95 | 103.5 | 4.5 | — | 7.0 |
| 14 | 91 | 51.5 | 5.0 | — | 4.0 |
| 15 | 85 | 57.5 | 5.0 | — | 3.0 |
| 16 | 109 | 66.0 | 3.2 | — | 3.2 |
| 17 | 103 | 72.0 | 3.5 | — | 2.5 |
| 18 | 104 | 66.0 | 3.0 | — | 2.8 |
| 19 | 102 | 71.5 | 3.0 | — | 3.0 |
| 20 | 116 | 5.6 | — | — | 2.0 |
| C | 118 | — | 5.0 | — | — |
| D | 83 | — | 2.6 | — | — |

What is claimed is:

1. A method of adhering textiles with a melt adhesive which is a polyamide melt adhesive having a melt viscosity, measured at 220° C., of 5-150 Pas and which is the reaction product of approximately equivalent amounts of an acid component and a basic component, said acid component comprising
   (a)(1) a dimerized fatty acid having a content of 70-100 percent by weight of dimeric fatty acid, and
   (a)(2) as a molecular weight regulator, 0 to 50 equivalent percent of the total carboxy groups of the mixture (a)(1) and (a)(2) of a monocarboxylic acid having up to 22 carbon atoms;
   (b) at least one aliphatic straight chain co-dicarboxylic acid having 6 to 13 carbon atoms, wherein the ratio of carboxylic acid according to (a)(1) and (a)(2) to carboxylic acid according to (b) is from 0.05:1 to 5:1, calculated on the carboxy groups, said basic component comprising
   (c) an aliphatic straight-chain diprimary diamine having 6 to 12 carbon atoms and
   (d) from 0.5 to 1.5 mol, per mol of carboxyl groups of said acid component, of a mixture comprising from 95 to 30 mol percent of caprolactam, ε-aminocaproic acid, or a mixture thereof and 5 to 70 mol percent of 11-aminoundecanoic acid, 12-aminoundecanoic acid, lauryl lactam, or a mixture thereof.

2. A method as in claim 1 wherein the ratio of carboxylic acid according to (a) to the carboxylic acid according to (b) is between 0.1:1 and 1:1.

3. A method as in claim 1 wherein said co-dicarboxylic acid is sebacic acid or azeleic acid.

4. A method as in claim 2 wherein said co-dicarboxylic acid is sebacic acid ot azeleic acid.

5. A method as in claim 1 wherein said diamine is heamethylene diamine.

6. A method as in claim 2 wherein said diamine is hexamethylene diamine.

7. A method as in claim 3 wherein said diamine is hexamethylene diamine.

8. A method as in claim 4 wherein said diamine is hexamethylene diamine.

9. A method as in claim 1 wherein said dimerized fatty acid comprises more than 90 percent by weight of dimeric fatty acid.

10. A method as in claim 1 wherein said acid component is free of component (a)(2).

11. A method as in claim 1 wherein said acid component contains more than 0 equivalent percent of component (a)(2).

12. A polyamide polymer having a melt viscosity, measured at 220° C., of 5-150 Pas and adaptable to use as a melt adhesive for adhering textiles, said polymer being the reaction product of approximately equivalent amounts of an acid component and a basic component, said acid component comprising
   (a)(1) a dimerized fatty acid having a content of 70-100 percent by weight of dimeric fatty acid, and
   (a)(2) as a molecular weight regulator, 0 to 50 equivalent percent of the total carboxy groups of the mixture (a)(1) and (a)(2) of a monocarboxylic acid having up to 22 carbon atoms;
   (b) at least one aliphatic straight chain co-dicarboxylic acid having 6 to 13 carbon atoms, wherein the ratio of carboxylic acid according to (a)(1) and (a)(2) to carboxylic acid according to (b) is from 0.05:1 to 5:1, calculated on the carboxy groups, said basic component comprising (c) an aliphatic straight-chain diprimary diamine having 6 to 12 carbon atoms and (d) from 0.5 to 1.5 mol, per mol of carboxyl groups of said acid component, of a mixture comprising from 95 to 30 mol percent of caprolactam, ε-aminocaproic acid, or a mixture thereof and 5 to 70 mol percent of 11-aminoundecanoic acid, 12-aminoundecanoic acid, lauryl lactam, or a mixture thereof.

13. A polymer as in claim 12 wherein said acid component is free of component (a)(2).

14. A polymer as in claim 12 wherein said acid component contains more than 0 equivalent percent of component (a)(2).

* * * * *